United States Patent

[11] 3,621,146

[72] Inventors Charles E. Morse; John P. Smith, both of Holmdel, N.J.
[21] Appl. No. 840,637
[22] Filed July 10, 1969
[45] Patented Nov. 16, 1971
[73] Assignee Bell Telephone Laboratories, Incorporated Murray Hill, N.J.

[54] KEY TELEPHONE STATION HAVING MULTINETWORK ACCESS

11 Claims, 6 Drawing Figs.

[52] U.S. Cl. .......... 179/18 AD, 179/18 DA, 179/99
[51] Int. Cl. .......... H04m 3/38
[50] Field of Search .......... 179/99, 18 AD, 18 DA, 27 CA

[56] References Cited

UNITED STATES PATENTS

| | | | |
|---|---|---|---|
| 3,150,238 | 9/1964 | Carter .......... | 179/99 |
| 2,765,372 | 10/1956 | Peterson .......... | 179/99 X |
| 2,754,366 | 7/1956 | Di Matteo .......... | 179/99 X |

*Primary Examiner*—Kathleen H. Claffy
*Assistant Examiner*—Thomas W. Brown
*Attorneys*—R. J. Guenther and James Warren Falk

ABSTRACT: A key telephone system is arranged to provide access to both secure and nonsecure lines while, at the same time, maintaining the degree of isolation between the lines required of secure communication facilities. Each key station is selectively connected to the nonsecure lines through one switching network while connections to secure lines are made through a separate switching network. A station control circuit associated with each key station provides access for that station to either one of the switching networks. The operation of a line key at any station enables the switching network serving that line so as to cause the establishment of a transmission path from the enabling station through the control circuit to the enabled network.

INVENTORS C. E. MORSE
J. P. SMITH
BY David Wannenbaum
ATTORNEY

KEY TELEPHONE STATION HAVING MULTINETWORK ACCESS

BACKGROUND OF THE INVENTION

This invention relates generally to key telephone systems and more particularly to an arrangement for providing access from one key station to any one of a number of line circuits served by separate switching networks.

DESCRIPTION OF PRIOR ART

Extensive development in private branch exchange (PBX) telephone systems in recent years has made possible the provision of numerous special features which render such PBX telephone systems more convenient and flexible. For example, circuit arrangements have been provided which enable communication paths to be established from one telephone station to any one of a number of other stations or to any one of a number of line circuits by simply operating a key associated with the desired connection. In such arrangements, it is common practice to concentrate the transmission lines from each key station and from each line circuit into a single switching network which network is key controllable directly from each station.

In situations where the communications from a key station contain sensitive material, it is necessary to insure that such communications remain private and secure from interference at all times. Such interference usually is the result of transmission signals which are inductively or capacitively coupled from other transmission paths in close proximity in the concentrated switching network. A second source of interference arises from trouble conditions such as the multiple operation of the switching network cross-points.

In existing systems privacy protection is insured by using special facilities, including separate lines and separate switching networks, for the sensitive communications. The special lines are terminated on separate key telephone instruments which are usually red to distinguish them from the regular black telephone sets in common usage. Thus, whenever a person has occasion to make or to receive sensitive communications, two completely independent key telephone sets must be provided, each arranged for exclusive access to one of the switching networks. It has been found that such duplication of equipment, in addition to being expensive to operate, results in numerous physically awkward situations thereby decreasing the convenience and flexibility of telephone communications.

In view of the foregoing, it is an object of this invention to provide a simple and economical key telephone system for secure and nonsecure communications so as to obviate the necessity of separate station equipment for each type of transmission.

It is another object of this invention to provide a key telephone switching system wherein the integrity of sensitive communications is maintained at all times even under trouble conditions in the switching network.

SUMMARY OF THE INVENTION

These and other objects are obtained in accordance with one exemplary embodiment of the invention wherein a key telephone system is arranged to provide each key station with access to both secure and nonsecure lines, while at the same time maintaining the degree of isolation between the lines required of securing communication facilities.

Each key station is selectively connected to any one of a number of nonsecure lines through a nonsecure (BLACK) switching network while connections to secure lines are made through a secure (RED) switching network. The networks, which consist of relay-controlled cross-point matrices are identical to each other and are separated physically so as to maintain complete isolation between them. A station control circuit is associated with each station to provide access for that station to either one of the switching networks. The line keys on each telephone station are connected directly to the crosspoint associated with that line in one of the networks. Upon crosspoint closure, the enabled switching network transmits signals to the station control circuit associated with the enabling station, which signals cause a transmission path to be established from the enabling station through the control circuit to the enabled switching network. In the event that the crosspoints associated with the same telephone set in both switching networks become enabled, the station control circuit is arranged to provide a connection only to the black network.

In accordance with one feature of the invention, a control circuit is serially inserted between a key telephone station and a number of switching networks in order to maintain transmission integrity between the networks.

In accordance with another feature of the invention, a control circuit is arranged to establish transmission paths from a key telephone station to an enabled one of a number of switching networks which network is selectively enabled directly from the telephone station.

In accordance with still another feature of the invention, a control circuit is serially inserted between a key telephone station and a number of switching networks and controllable by signals from an enabled one of networks for establishing communication links from the associated station to the enabled network and for electrically monitoring the established link to insure that the integrity of the communication over that link is maintained.

DESCRIPTION OF THE DRAWING

The foregoing objects, features and advantages, as well as others of the invention, will be more apparent from the following description of the drawing, in which.

It will be noted that FIGS. 2 through 5 employ a type of notation referred to as "detached contact" in which an "X" shown intersecting a conductor represents a normally open contact of a relay and a bar shown intersecting a conductor at right angles represents a normally closed contact of a relay; "-normally" referring to the unoperated condition of the relay. The principles of this type of notation are described in an article entitled "An Improved Detached Contact Type Schematic Circuit Drawing" by F. T. Meyer in the Sept. 1955 publication of the *American Institute of the Electrical Engineers Transactions, Communications and Electronics*, vol. 74, pages 505–513.

Figure 2:
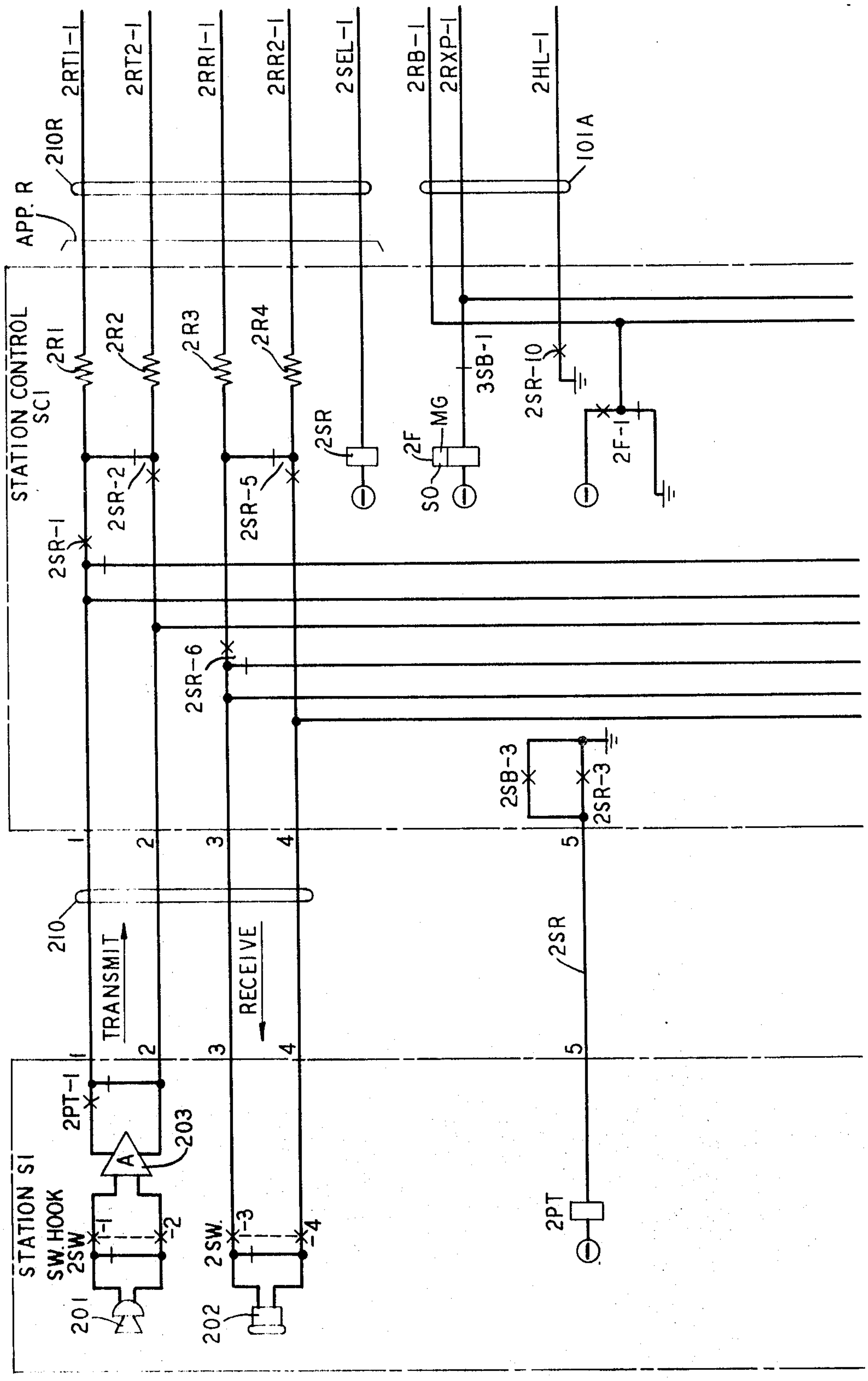
FIGS. 2 through 5 are schematic drawings showing in greater detail the interrelation of the components of the exemplary embodiment.

It will be noted also that in order to simplify the disclosure and thus facilitate a more complete understanding of the embodiment, the relays, relay contacts and other electromechanical devices shown in FIGS. 2 through 5 have been given systematic designations. Thus, the number preceding the letters of each device correspond to the figure in which the control circuit of the device is shown. Thus, the coil of relay 2PT is shown in FIG. 2. Each relay contact, either make, key or transfer, is shown with its specific contact number preceded by the designation circuit the relay to which it belongs. For example, the notation 2PT-1 indicates contact number 1 of relay 2PT the coil of which is shown in FIG. 2.

1.0 GENERAL DESCRIPTION

Figure 1:
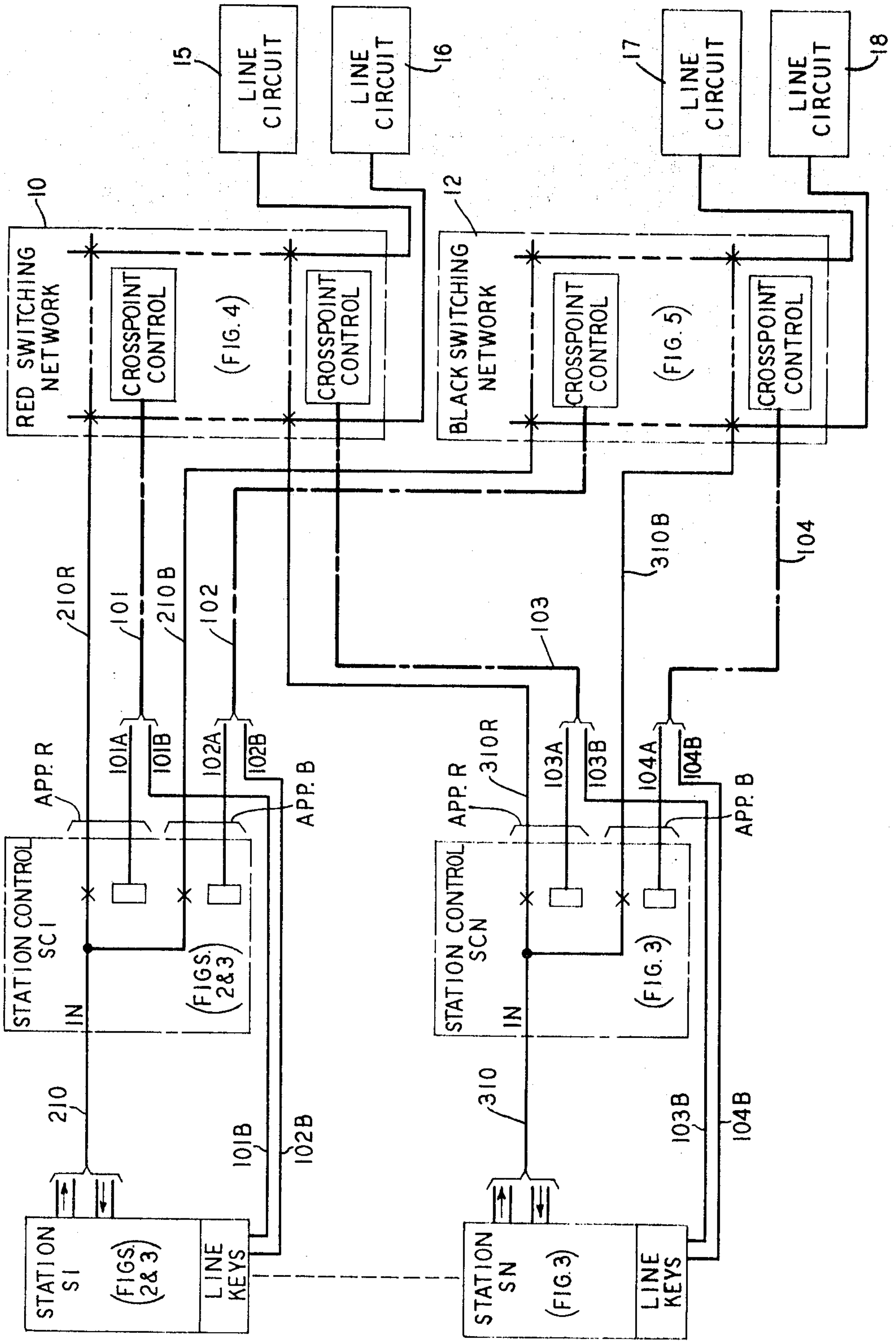
FIG. 1 is essentially a block diagram showing the interrelation of the exemplary embodiment of the invention.

Referring now to FIG. 1, the present invention is illustrated in a key telephone system having key stations Sl through SN. Each station is individually associated with a station control circuit SCl–SCN, which circuit has an appearance on each of the switching networks, such as red switching network 10 and black switching network 12, via cables 210R and 210B, respectively.

Line keys on each station are connected to the switching network associated with that line. For example, the line key at station SI corresponding to line circuit 15 is connected, via cable 101B, to the crosspoint control associated with red switching network 10. In similar manner, the line key at station SI corresponding to line circuit 17 is connected, via cable 102B, to crosspoint control associated with black switching network 12.

The crosspoint control of each switching network is connected also to a transmission enabling circuit in the station control circuit corresponding to the associated station. For example, in red switching network 10, the crosspoint control associated with station SI is connected via cable 101A to appearance R of station control circuit SCI, while in black switching network 12 the crosspoint control associated with station SI is connected via cable 102A to appearance B of station control circuit SCI. In a similar manner in red switching network 10 the crosspoint control associated with station SN is connected via cable 103A to appearance R of station control circuit SCN while in black switching network 12 the crosspoint control associated with station SN is connected via cable 104A to appearance B of station control circuit SCN.

Accordingly, the enabling of a line key at station SI corresponding to line circuit 15 closes the associated crosspoints in red switching network 10 thereby providing an enabling signal to appearance R of station control circuit SCI. In response to this enabling signal, a transmission path is established from station SI through station control circuit SCI and through red switching network 10 to line circuit 15.

As will be more apparent from that which is contained hereinafter, each station control circuit is arranged to ascertain that only one set of crosspoints corresponding to an associated station is enabled and that only one network is currently involved in a connection to that station. In the event that more than one switching network bids for a concurrent connection from the same key station, the associated station control circuit is arranged to provide a connection only to a preferred one of the switching networks while inhibiting connections to the other network.

It should be noted at this point that each switching network is shown associated with a group of line circuits which circuits, although not shown, may be arranged to extend connections from key stations to a distant line, to a machine, such as a tape recorder, or back through the switching network in the well-known intercom fashion.

2.0 DETAILED DESCRIPTION

The following text will describe the embodiment of the invention in detail with reference to FIGS. 2, 3, 4, and 5. In order to facilitate a clear understanding of the invention, two switching networks have been set forth in FIGS. 4 and 5, respectively, which networks are each arranged to connect any of the stations connected to the horizontal inputs to any of the line circuits connected to the vertical outputs. For illustrative purposes, only two such line circuits have been shown for each of the switching networks 10 and 12. However, it should be understood that any number of line circuits may be connected to each switching network and accessed from any key telephone station merely by operation of a line pickup key associated therewith at the station.

Figure 3:
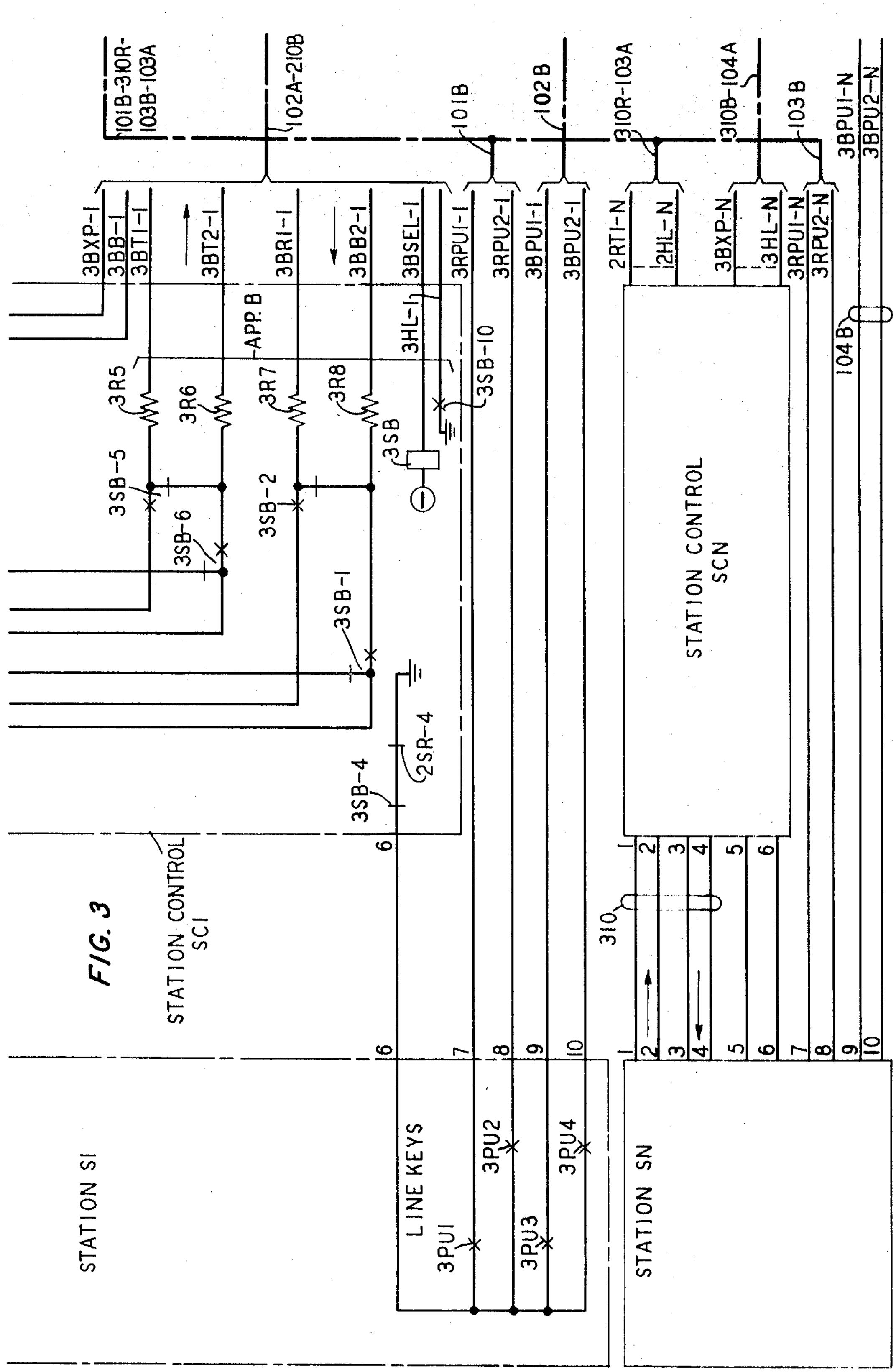
Figure 4:
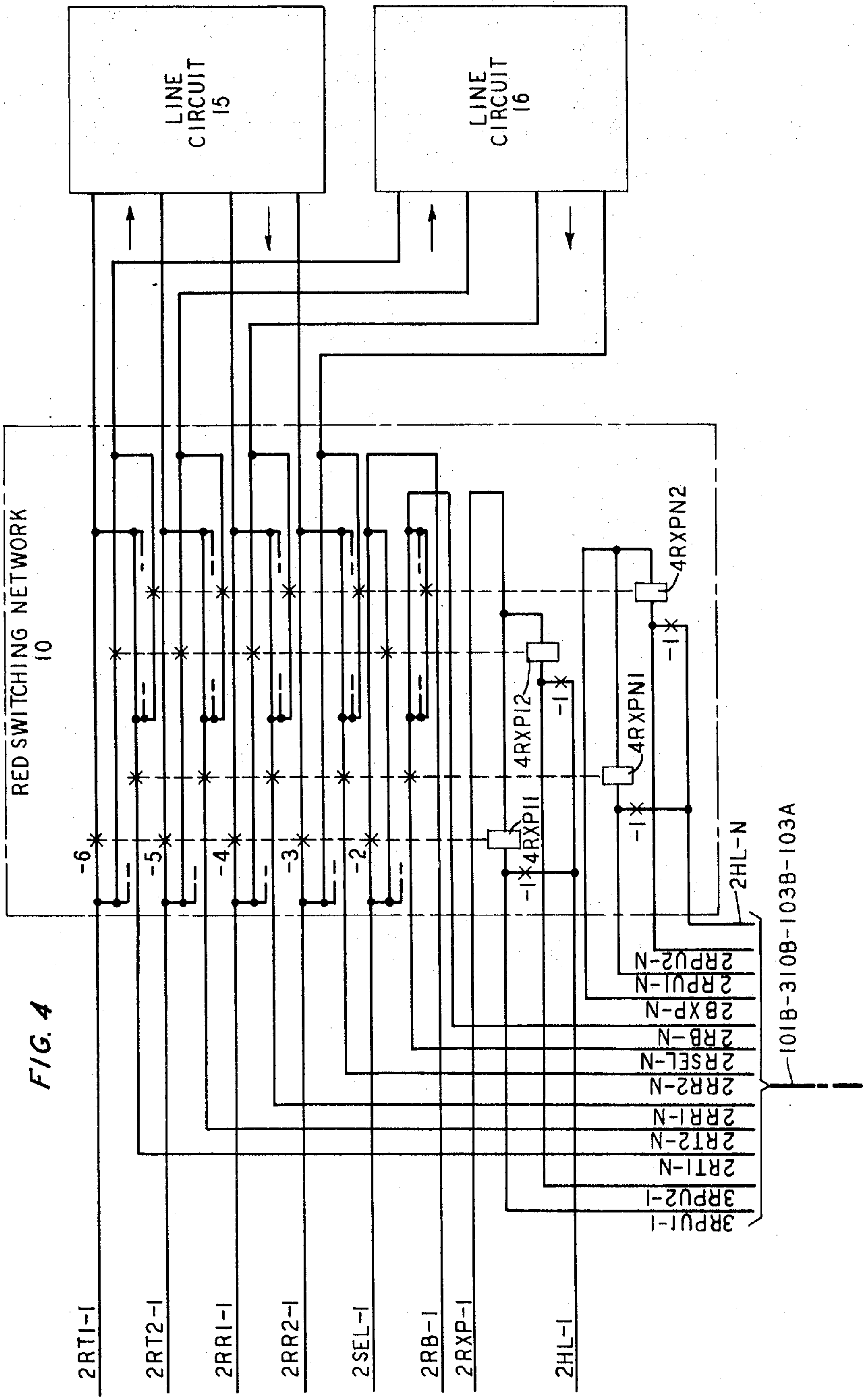
Figures 5, 6:
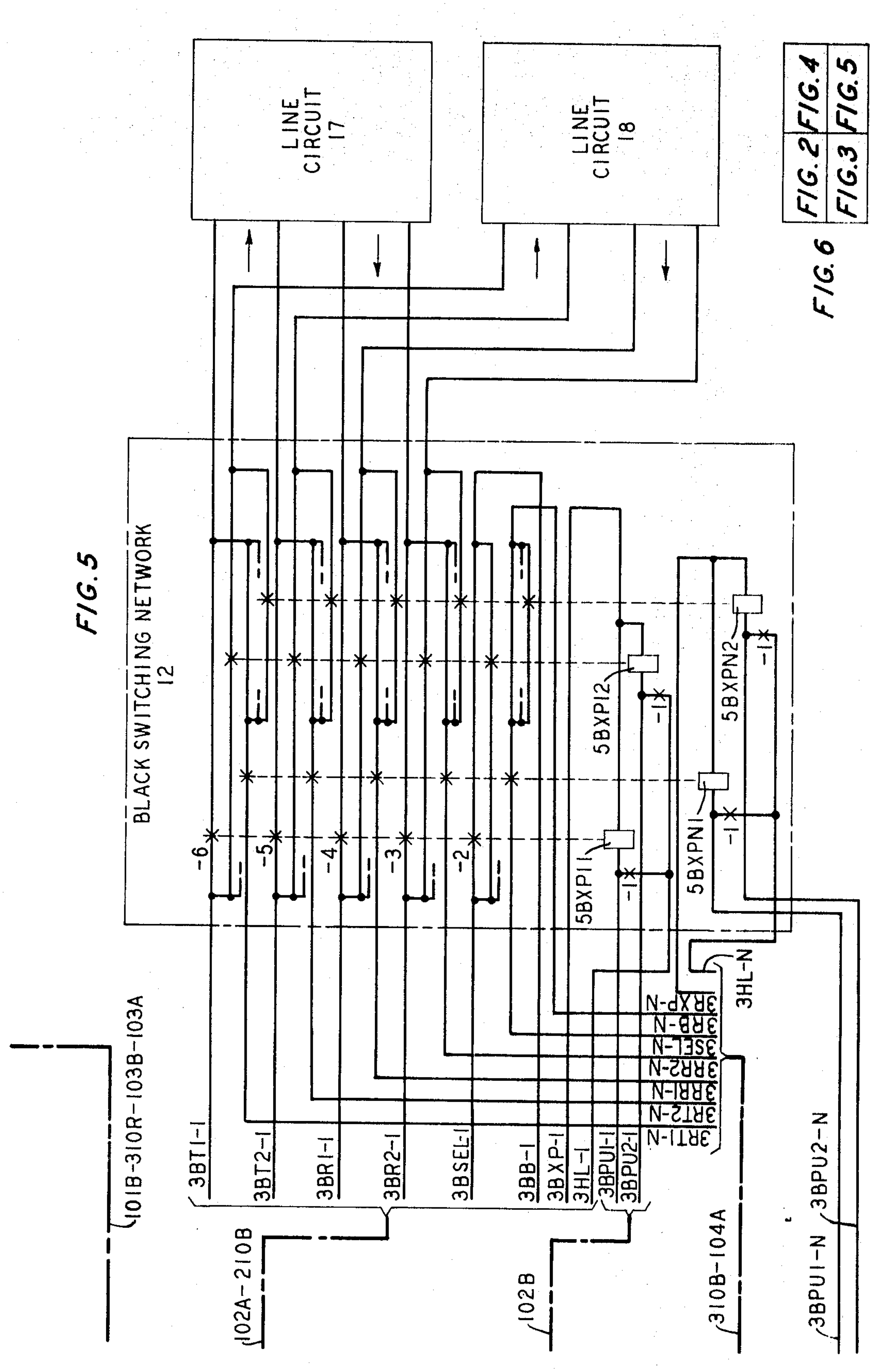
FIG. 6 shows the manner in which the other figures should be arranged.

Turning now to FIG. 3, it will be assumed that a subscriber at station SI desires to establish a connection with a secure line circuit such as line circuit 15. Accordingly, line key 3PUI is operated at station SI and ground from the associated station control circuit SCI, via released break contacts 2SR-4, and 3SB-4 is extended through the enabled 3PUI key contact and over lead 3RPUI-1 of cable 101B to FIG. 4. Ground on lead 3RPUI-1 in FIG. 4 is extended to relay 4RXP11 and through the relay winding and over the 2RXP-1 lead to FIG. 2 through released break contact 3SB-1 and through the winding of relay 2F to battery. Accordingly, crosspoint relay 4RXP11 operates at this time. However, relay 2F, which is a marginal relay requiring an operate current greater than that provided by the resistance of relay coil 4RXP11, remains normal.

Turning now to FIG. 2, ground from released break contact 2F-1 is extended via lead 2RB-1 to FIG. 4 and through enabled crosspoint contact 4RXP11-2 and back via lead 2SEL-1 to FIG. 2, thereby operating relay 2SR to battery.

The operation of relay 2SR extends a ground via enabled make contact 2SR-10 and lead 2HL-1 to FIG. 4 so as to maintain crosspoint relay 4RXP11 operated through off-normal contact 4RXP11-1. Operation of relay 2SR also enables relay 2PT in station SI (FI.G. 2) from ground through enabled make contact 2SR-3 and lead 2SR. Accordingly, a two-way transmission path is established from station SI through the station control circuit SC1 and through red switching network 10 to line circuit 15. The transmit portion of this transmission path consists of transmitter 201; enabled switchhook contacts 2SW-1 and 2SW-2; amplifier 203; enabled transfer contact 2PT-1 of station SI; leads 1 and 2 of cable 210; enabled transfer contacts 2SR-1 and 2SR-2; resistors 2R1 and 2R2 of station control circuit SC1; cable 210R leads 2RT1-1 and 2RT2-1 to FIG. 4; and cross-point contacts 4RXP11-5 and 4RXP11-6 of red switching network 10 to circuit 15.

A return transmission path (receive path) is similarly established from line circuit 15 through red switching network 10, crosspoint contacts 4RXP11-4 and 4RXP11-3; leads 2RR1-1, 2RR2-1 to FIG. 2; through station control circuit SC1 via resistors 2R3 and 2R4, enabled transfer contacts 2SR-5 and 2SR-6; leads 3 and 4 of cable 210 to station S1 and receiver 202 via enabled switchhook contacts 2SW-3 and 2SW-4. Accordingly, two-way communication is possible between a subscriber at station S1 and line circuit 15 through red switching network 10.

It should be noted at this point that although only the transmission paths have been described, similar paths are available for connecting the control circuits, such as hold, ringing and dialing (which are not shown) through the switching network to the connected line circuit.

2.1 TRANSMISSION PROTECTION

Review of the station control circuit SC1 shown in FIGS. 2 and 3 with respect to the possibility of induced transmission, either by inductive or capacitive coupling will now be made. As previously described, the enabling of relay 2SR completes a transmission path from input leads 1, 2, 3, and 4 to appearance R of station control circuit SC1. Communication over this path is prevented from being cross-coupled to appearance B via enabled break contacts 2SR-1 and 2SR-6. In addition, high frequencies which could bridge the open 2SR-1 and 2SR-6 contacts are attenuated by released break contacts 3SB-6 and 3SB-1 which contacts provide direct shorts across the transmit and receive pairs, respectively, of the interconnect paths between the two appearances, R and B, of station control circuit SC1. The open contacts insure against low-frequency coupling while the shorted lines provide protection against high-frequency signals. These contacts have been arranged to provide an extremely effective high-frequency and low-frequency transmission pad, having in excess of 100 db. loss, thereby insuring that the transmission integrity of communications through the red switching network is maintained.

At this point, it should be noted that each appearance R and B of station control circuit SC1, when not enabled, is arranged with a short circuit across the respective transmission paths via break contacts 2SR-2, 2SR-5, 3SB-5, and 3SB-2. These short circuits in conjunction with the above-described signal pad, provide protection from transmission signals cross-coupled from other connections in the respective concentrated switching networks. If such protection were not provided, a subscriber utilizing the secure network upon hearing cross talk would assume that the line was no longer secure and would terminate the connection. Accordingly, each station control circuit is arranged to provide transmission protection from the switching network associated with its idle network appearance as well as being arranged to maintain complete isolation security between the networks.

2.2 TROUBLE CONDITION—EXTRA CROSSPOINT CLOSURE

In the event that a trouble condition occurs and the crosspoints of a station connected through a switching network become associated with a second line circuit, all transmission paths through that switching network 10 associated with that station are terminated immediately.

Turning again to FIG. 3, it will be noted that since a transmission path is currently established through red switching network 10, relay 2SR is operated. Accordingly ground is removed from the line keys of station S1 via enabled break contact 2SR-4. Thus, the accidental enabling of a second line key at station S1 is of no consequence so far as circuit operation is concerned. However, for purposes of illustration, let us assume that because of a trouble condition ground is present on lead 3RPU2-1 of cable 101B. Accordingly, ground is transmitted over cable 101B-310R-103B-103A to FIG. 4 to one side of relay winding 4RXP12. Since the other side of the winding is connected in parallel with the winding of enabled relay 4RXP11 and with lead 2RXP-1, the current over lead 2RXP-1 to FIG. 2 is doubled thereby enabling the operation of marginal relay 2F.

The operation of relay 2F substitutes battery for ground on lead 2RB-1 via now enabled transfer contact 2F-1. Accordingly, battery is extended over cable 101A, lead 2RB-1, to red switching network 10, FIG. 4, and through the enabled crosspoint contact 4RXP11-2 back to FIG. 2 via lead 2SEL-1 and cable 210R thereby releasing relay 2SR. The release of relay 2SR opens the transmission path from station S1 to line circuit 15 via released make contacts 2SR-1 and 2SR-6 and released break contacts 2SR-2 and 2SR-5. Concurrent therewith, ground is removed from lead 2HL-1 via released make contact 2SR-10 thereby releasing the previously enabled crosspoint relay 4RXP11.

It should be noted that the operation of marginal relay 2F causes a specific release potential, namely, battery, to be transmitted over lead 2RB-1 and through red switching network 10 to relay 2SR as a positive release signal thereby insuring the release of relay 2SR even when a false ground is present on lead 2SEL-1 from red switching network 10.

2.3TROUBLE CONDITION—EXTRA SWITCHING NETWORK ENABLED

In the event that a trouble condition occurs and a crosspoint corresponding to station S1 in black switching network 12 becomes enabled while station S1 is connected through red switching network 10, all transmission through red switching network 10 to station S1 is terminated immediately.

Turning again to FIG. 3, it will be recalled that since a transmission path is currently enabled through red switching network 10, relay 2SR is operated thereby removing ground from the line keys via enabled break contact 2SR-4. However, for purposes of illustration let us assume that because of a trouble condition ground is present on lead 3BPU1-1, which ground corresponds to an enabling signal for line circuit 17 accessible only through black switching network 12. Accordingly, ground is transmitted over 102B to one side of crosspoint relay winding 5BXP11 in black switching network 12, FIG. 5. The other side of the winding is connected via lead 3BXP-1, cable 102A-210B, to battery through the winding of marginal relay 2F, FIG. 2, thereby completing an operate path for crosspoint relay 5BXP11. In the manner detailed hereinbefore for connections to red switching network 10, ground is provided over lead 3B-1, FIG. 3, to black switching network 12, FIG. 5, via the enabled crosspoint contact 5BXP11-2 and over lead 3BSEL-1 to operate relay 3SB in station control circuit SC1.

Since the windings of two crosspoint relays, relay 4RXP11 in red switching network 10 and relay 5BXP11 in black switching network 12, associated with the same station are now in parallel with each other and in series with marginal relay 2F, enough current flows through the winding of relay 2F to cause its operation. However, relay 2F is arranged for slow operation such that relay 3SB, which relay operates in the manner set forth above, operates first thereby removing crosspoint relay 4RXP11 from the parallel connection via enabled break contact 3SB-1, FIG. 2. Accordingly, crosspoint relay 4RXP11 releases at this point thereby opening the transmission path through red switching network 10. Release of the crosspoint path through red switching network 10 causes the release of relay 2SR in station control l circuit SC1 thereby opening the transmission path from the input leads 1, 2, 3, 4, to appearance R output leads 2RT1-1, 2RT2-1, 2RR1-1, and 2RR2-1 in the manner previously set forth.

Turning now to FIG. 3, the operation of relay 3SB removes the short circuit from output appearance B leads 3BT1-1, 3BT2-1, 3BR1-1, and 3BR2-1 via enabled transfer contacts 3SB-5 and 3SB-2. A transmission path is established from station S1 to line circuit 17 through station control circuit SC1 via input leads 1, 2, 3, and 4, FIG. 2, released transfer contacts 2SR-1 and 2SR-6, enabled transfer contacts 3SB-2 and 3SB-1, FIG. 3, resistors 3R5, 3R6, 3R7, and 3R8 and the output leads of appearance B. Accordingly, the previously established transmission path from station S1 through red switching network 10 has been preempted by a transmission path through black switching network 12. The system is arranged in this manner so that when a trouble condition exists in both networks, one of the networks takes priority so that at least part of the system remains in service.

2.4 CONCLUSION

While the equipment of this invention has been shown in a particular embodiment wherein a station control circuit is arranged to provide access for a key station via a particular one of a group of separate switching networks to a selected one of a number of line circuits, it is understood that such an embodiment is intended only to be illustrative of the present invention and numerous other arrangements may be devised by those skilled in the art without departing from the spirit and scope of the invention.

For example, this invention could be used to provide access for a subscriber station to any one of a number of separate and distinct data retrieval or data storage devices, either directly or through intermediate switching networks.

What is claimed is:

1. In combination a plurality of line circuits divided into groups, a plurality of networks each selectively operable normally to enable connections exclusively to line circuits in one of said groups, a station having a plurality of keys each key operable for enabling a connection to a particular line circuit associated therewith through said network associated with said particular line circuit, and means responsive to the enabling of any one of said networks for connecting said station exclusively to said enabled network, said station connection means including a station control circuit comprising means for maintaining isolation security between said networks.

2. The invention set forth in claim 1 wherein said isolation security means includes means for detecting a nonnormal concurrent enabling of more than one said connection from said station, and means responsive to the enabling of said detection means for releasing all said concurrently enabled connections.

3. The invention set forth in claim 2 wherein said isolation means further includes means for determining the enabled ones of said networks associated with said station, means controlled by said determining means for inhibiting said detection means when said concurrently enabled connections are in separate networks, and means responsive to the enabling of said determining means for releasing said enabled connections only in certain ones of said networks.

4. The invention set forth in claim 1 wherein said isolation means includes a high-frequency and a low-frequency transmission pad between said networks.

5. In combination a telephone station having a plurality of keys, a plurality of switching networks having horizontal and vertical multiples, means responsive to the operation of one of said keys at said telephone station for enabling a connection between a horizontal and vertical multiple in a network exclusively associated with said operated key; and a station control circuit associated with said telephone station comprising an input connected to said station, a plurality of outputs each exclusively connected to one of said horizontal multiples in separate ones of said switching networks, means responsive to the enabling of a connection through one of said networks and controlled by said enabled network for establishing a connection between said station input and the output associated with said enabled network, and means for insuring complete isolation between said enabled output and all other ones of said outputs.

6. The invention set forth in claim 5 wherein said isolation means includes means responsive to the concurrent enabling of more than one network from one station for inhibiting connections from said one station through all but a preferred one of said networks.

7. The invention set forth in claim 5 wherein said isolation means includes means responsive to the concurrent enabling from one station of more than one connection in one of said networks for releasing all said connections.

8. In a key telephone system a plurality of line circuits arranged in groups, a plurality of telephone stations each arranged with line keys individually associated with said line circuits, a plurality of switching networks each comprising input and output terminals, crosspoint means in each of said networks operable for selectively connecting any of said input terminals to any of said output terminals, a first group of said line circuits connected individually to said output terminals of a first switching network, a second group of said line circuits connected individually to said output terminals of a second switching network, a station control circuit individually associated with each said key station operable to provide a transmission path from said associated station to an input terminal exclusively associated with said associated station in each of said switching networks, means responsive to the enabling of a line key associated with a first line circuit in said first group of line circuits at one of said stations for enabling the crosspoint associated with said one station and with said first line circuit in said switching network, and means responsive to the enabling of said crosspoint for enabling a transmission path through said station control circuit associated with said one station to said exclusively associated input terminal in said enabled first switching network.

9. The invention set forth in claim 8 further comprising trouble-detection means in each said station control circuit operable upon the enabling of more than one cross-point associated with said station control circuit, and means responsive to the enabling of said trouble detecting means for releasing all said enabled cross-points.

10. The invention set forth in claim 9 further comprising means responsive to the enabling of crosspoints associated with said station control circuit in more than one said switching network for inhibiting said trouble detection means and for releasing said enabled crosspoints in all but a preferred one of said switching networks.

11. In a key telephone system wherein any key station may enable a connection to any other key station or to any one of a first group of line circuits through a first switching network or any one of a second group of line circuits, through a second switching network, a station control circuit serially connected between each said key station and each of said switching networks comprising, an input connected to said associated key station, a first output connected to said first switching network, a first relay operably to enable a connection from said input to said first output, a second output connected to said second switching network, a second relay operably to enable a connection from said input to said second output, said first and said second relays having contacts arranged in cooperation with each other to form a high- and a low-frequency transmission pad between said first and second outputs when both of said outputs are idle as well as whenever one of said outputs is enabled, a marginal relay enabled by the concurrent enabling of more than one connection associated with said associated key station in either said first or said second switching networks for inhibiting the enabling of said output associated with said concurrently enabled switching network, and a relay contact of said second relay arranged to insure that when concurrent connections are enabled in both of said switching networks said first switching network is inhibited while operational priority is given to said second switching network.

* * * * *

UNITED STATES PATENT OFFICE
CERTIFICATE OF CORRECTION

Patent No. 3,621,146 Dated November 16, 1971

Inventor(s) Charles E. Morse and John P. Smith

It is certified that error appears in the above-identified patent and that said Letters Patent are hereby corrected as shown below:

Column 2, lines 45 and 46, change "-normally" to --"normally"--.

Column 2, line 61, change "key" to --break--.

Column 2, line 63, change "circuit" to --of--.

Column 4, line 11, change "(FI.G. 2)" to --(FIG. 2)--.

Column 5, line 70, change "3B-1" to --3BB-1--.

Column 6, line 12, delete "1" after "control".

Column 8, line 5, before "switching" insert --first--.

Column 8, line 33, change "operably" to --operable--.

Column 8, line 37, change "operably" to --operable--.

Signed and sealed this 6th day of June 1972.

(SEAL)
Attest:

EDWARD M.FLETCHER,JR.
Attesting Officer

ROBERT GOTTSCHALK
Commissioner of Patents